Figure 1:
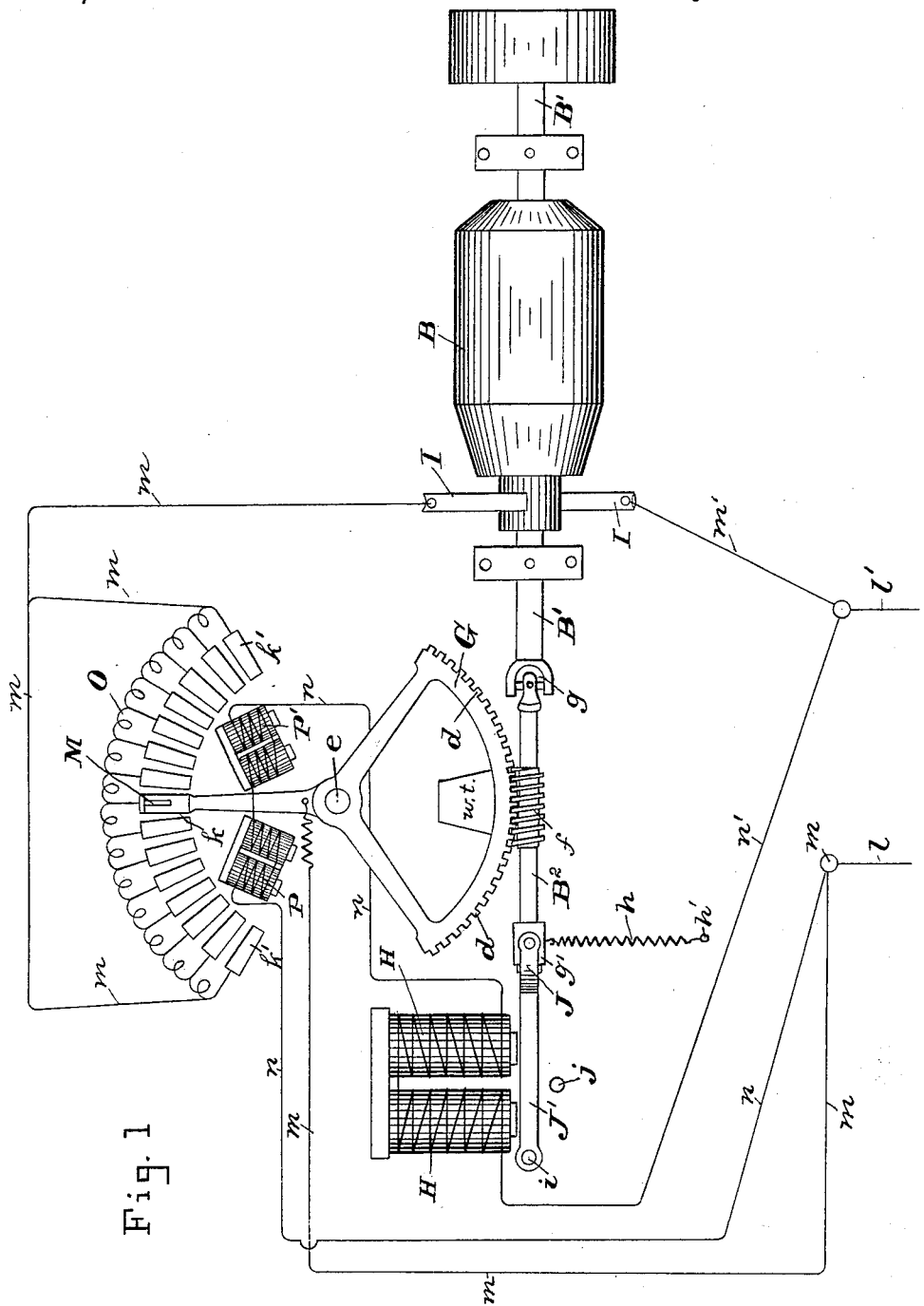

(No Model.) 3 Sheets—Sheet 1.

G. H. WHITTINGHAM.
AUTOMATIC DEVICE FOR REMOVING RESISTANCES IN STARTING ELECTRIC MOTORS AND REPLACING SAME.

No. 520,280. Patented May 22, 1894.

Witnesses
C. R. Weaver
Charles B. Mann Jr

Inventor
Geo. H. Whittingham
By Chas. B. Mann
Attorney

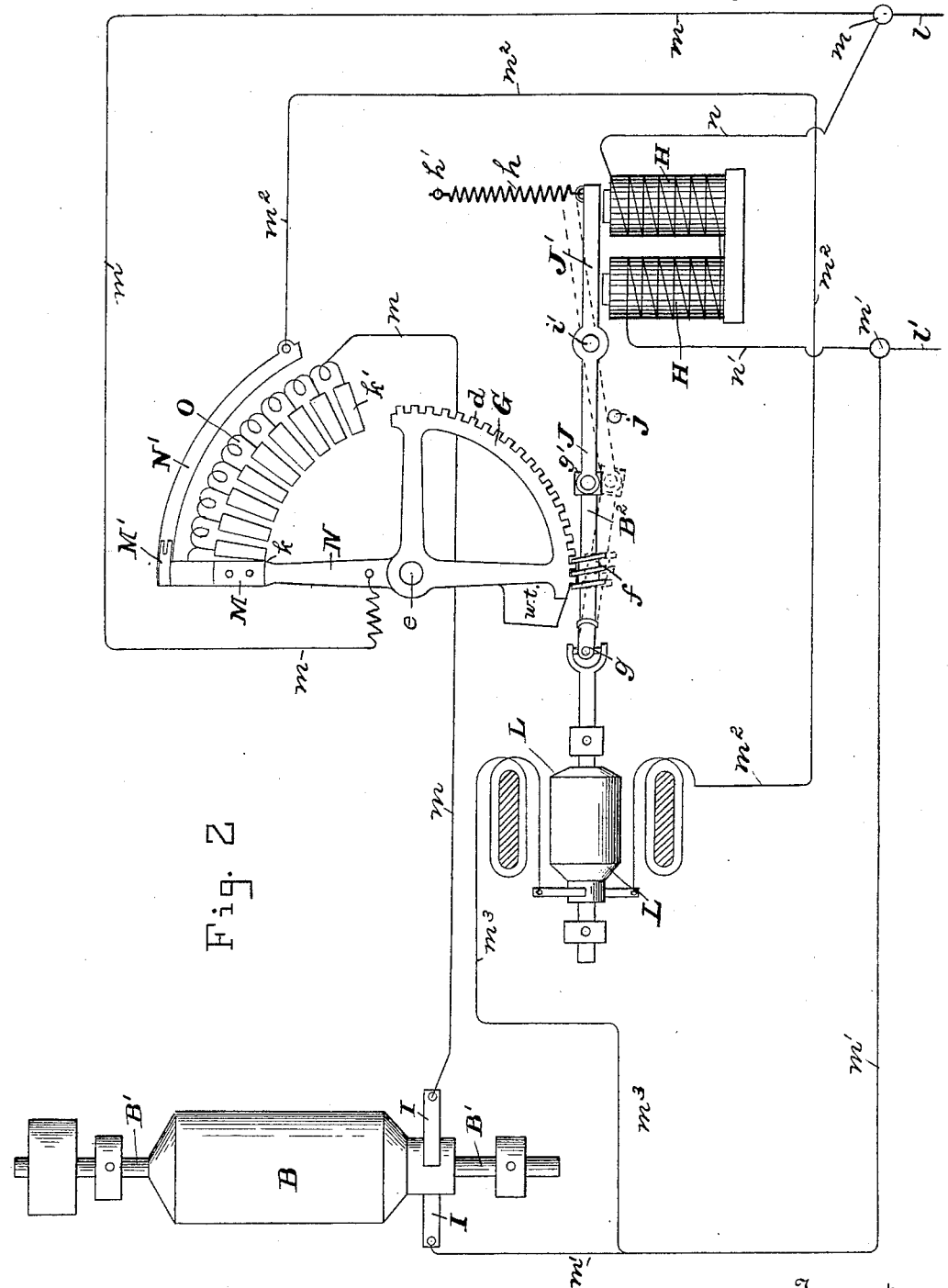

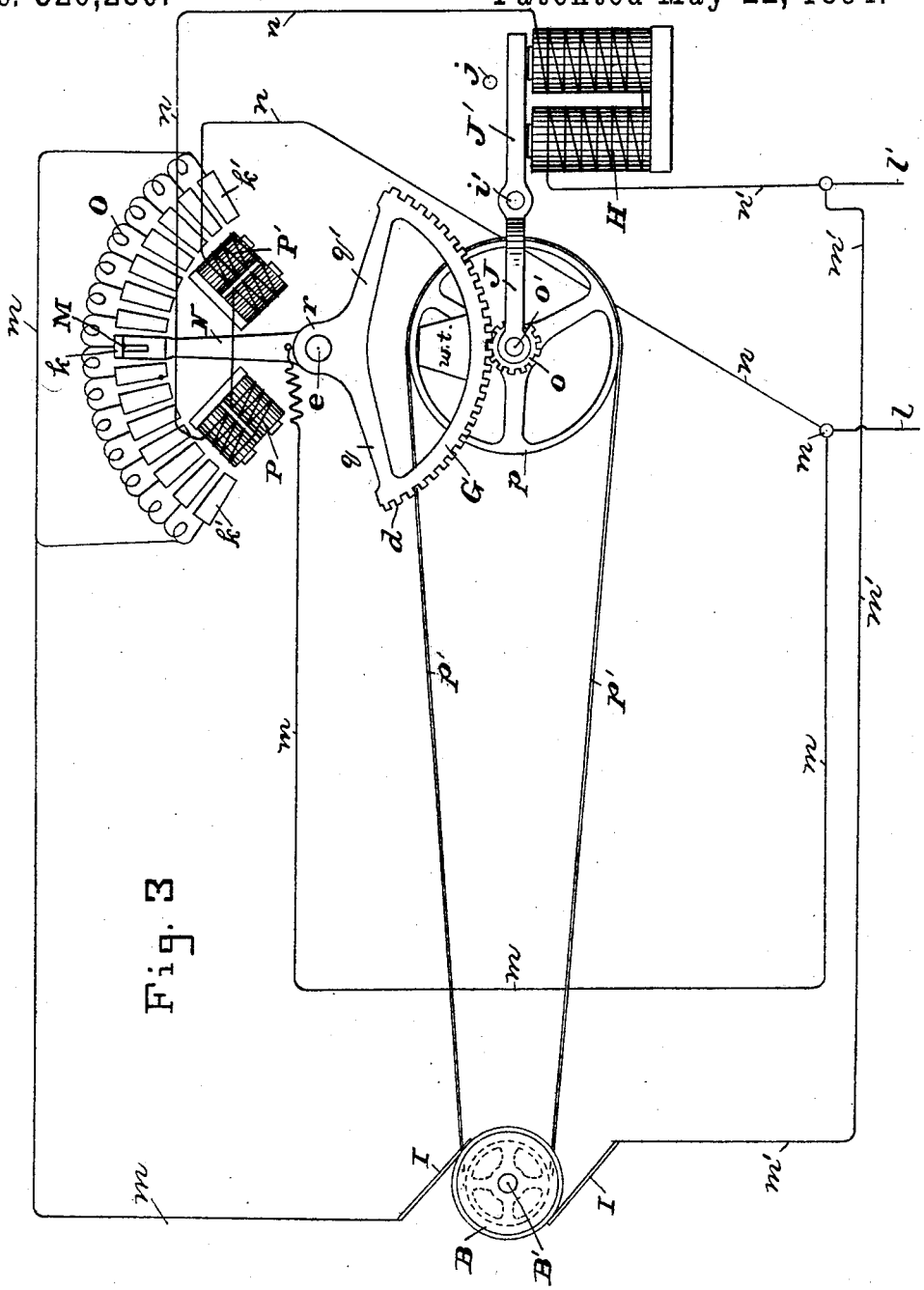

UNITED STATES PATENT OFFICE.

GEORGE H. WHITTINGHAM, OF BALTIMORE, MARYLAND, ASSIGNOR TO THE AUTOMATIC SWITCH COMPANY OF BALTIMORE CITY, OF MARYLAND.

AUTOMATIC DEVICE FOR REMOVING RESISTANCES IN STARTING ELECTRIC MOTORS AND REPLACING SAME.

SPECIFICATION forming part of Letters Patent No. 520,260, dated May 22, 1894.

Application filed June 13, 1893. Serial No. 477,465. (No model.)

*To all whom it may concern:*

Be it known that I, GEORGE H. WHITTINGHAM, a citizen of the United States, residing at Baltimore, in the State of Maryland, have invented certain new and useful Improvements in Automatic Devices for Removing Resistances in Starting Electric Motors and Replacing Same, of which the following is a specification.

This invention relates to an automatic starting device for electric motors and has for its object to gradually reduce the resistance in the armature circuit of the motor automatically when the current is turned on and the motor starting, by cutting out the coils of resistance one after the other from that of the greatest resistance to that of the least resistance, and maintaining it in this position during the running of the motor so that when the circuit through the motor is first completed to start the motor the current will meet with the greatest resistance and when the motor is fully running there will be the least resistance in the passage of the current; the purpose of this is to prevent the burning out of the armature of the motor when starting. When the current is shut off this controlling device operates to automatically replace the resistance in the circuit in readiness to be started again.

It will be understood of course, that I do not limit myself to the detail of construction shown, for the invention as broadly conceived by me and as defined in my claims may be embodied in many other forms.

In the accompanying drawings illustrating my invention,—Figure 1. shows a diagrammatic view illustrating the armature, armature-shaft and commutator of an electric motor, the improved resistance-controlling device, the line wires and the resistance coil. Fig. 2. shows a view similar to Fig. 1. with exception that a supplemental motor is used for operating the resistance-controlling device. Fig. 3. shows a view of parts similar to those seen in Fig. 1. and illustrates a modification in the construction of the resistance-controlling device.

Referring to Fig. 1, the letter, B, designates the armature, B', the armature-shaft, and, I, the commutator brushes of an electric motor, which may be of any desired construction. A segment-shaped bar, G, is pivoted at, e, so as to swing in a vertical plane; this bar has teeth, d, and is so constructed that normally, when not in use, its gravity will cause it to hang pendent and take the position shown in the drawings. To facilitate this the segment bar, in the present instance, at its center, carries a weight, w, t. An upward-projecting arm, N, is attached to the segment-shaped bar, but is insulated therefrom; this arm carries a contact-shoe, M, of any desired construction. Contact plates k, k', are arranged in an arc of a circle described from the pivot stud, e, and each plate is insulated from the others and is connected with the resistance coil, O. The center plate, k, is the one of greatest resistance and the two plates, k', at the opposite ends respectively of the arc are the ones of least resistance, that is, when the shoe is in contact with plate, k, the electric current must pass through the entire resistance coil, O, but when it is in contact with either of the plates, k', the electric current must pass through a small portion of resistance coil. When the motor is not running the contact shoe, M, on the arm of the segment, rests on the center plate, and when the current is turned on to start the motor, the arm or shoe will move toward one or the other of the end-plates, k', according to the turning of the armature-shaft one way or the opposite way. A worm, f, is fixed on a supplemental section, $B^2$, of the armature shaft and intermediate of its ends; this worm section is connected with the armature-shaft proper by a universal joint, g, and turns with it. Under certain conditions the worm meshes with the teeth, d, of the segment shaped bar, G. It will be seen that with the universal joint, g, as a center, the other end of the supplemental section, $B^2$, being free may be raised and lowered, whereby the worm, f, can be made to engage with or disengage from the teeth, d, on the segment shaped bar. The end of the supplemental section, $B^2$, opposite the one connected with the universal joint, g, is loose so as to both turn and slide in a collar, g', pivoted between the forked arms, J, at the free end of an armature, J', the opposite end of the said armature being pivoted on a stud, *i*. A pair of electro magnets, H, are fixed above the armature, J', and when energized attract the same. A stop pin, *j*, prevents the free end of the armature from falling out of the field of the electro-magnets, H, and a spiral spring, *h*, with one end attached to the collar, *g'*, and the other to a fixed stud, *h'*, tends to draw the free end of the armature, J', against the stop-pin, *j*, and against the action of the electro-magnets, H. It will be seen from the foregoing that when the magnets, H, are energized the worm, *f*, will be brought into engagement with teeth, *d*, and when they are not energized the worm will be disengaged from the teeth. Two additional pairs of electro-magnets, P, P', in same circuit with the electro-magnets, H, and energized simultaneously therewith are employed to disengage the segment-bar, G, from the worm, *f*, when the motor is fully running or in other words—when the contact shoe, M, is approaching the plate, *k'*, of least resistance. At this time the one or the other of the two pairs of electro-magnets, P, P', will attract one or the other of the two arms, *q*, *q'*, which connect the segment-shaped bar with the hub, *r*, and the bar will thereby be drawn farther and disconnect from the end of the worm, *f*, when the thread of the latter is leaving the last tooth, *d*, of the bar, G, and thus allow the worm to turn freely and its end not rub against the last tooth of the bar.

Having described the several parts of this construction, the operation of them is as follows:—When the motor is connected with lines, *l*, *l'*, by any suitable switch, the current will flow say along the lines, *m*, to arm, N, through shoe, M, contact plates, *k*, *k'*, resistance coil, O, commutator brushes and motor, and then along line, *m'*, back to line, *l'*; a part of the current will flow from line, *m*, along line, *n*, to the electro-magnets, P, P', and electro-magnets, H, energizing them and then flow along line, *n'*, to the line, *m'*, already mentioned, and thence to main line, *l'*. It will now be observed that the worm, *f*, will be brought into engagement with the teeth of the segment shaped bar, G, and as the armature, B, of the motor at same time starts to rotate, due to the action of the current, the worm, *f*, will swing the bar, G, about its pivot, *e*, and said bar in turn moves the contact shoe, M, either to one side or the other, over the contact plates, *k*, *k'*, cutting successively the separate coils of the rheostat, O, out of the circuit, thus gradually reducing resistance to the passage of the full current to the motor, and allowing the latter to exert its maximum power. When the shoe is in contact with the plate, *k'*, indicating the least resistance, the worm, *f*, will be rotating outside or beyond the last tooth, *d*, of the segment shaped bar, and one pair of the energized magnets, P, will keep it deflected and the shoe, M, in contact with the plate, *k'*, of the least resistance. It will be seen that the contact shoe advances over the contact plates by a continuous movement in distinction to advancing by an intermittent movement. The power for operating the contact shoe is obtained from the motor. When the main line, *l*, *l'*, is cut out, the main armature and worm, *f*, will stop rotating; the electro magnets, H, and, P, P', will be demagnetized, the worm section, B², be allowed to drop and the segment-bar, G, will be released by the electro-magnets, P, P' and by the action of the gravity of its weight will swing back into its normal position and the shoe, M, come into contact with the center or highest resistance plate, *k*, thus bringing the greatest resistance again into the circuit in readiness for the motor to start. In the above construction the shoe, M, resistance coil, O, contact plates, &c., are made so that the armature, B, of the motor may run in either direction, and yet the resistance will be cut out automatically and without affecting the working of the apparatus.

In Fig. 2 a construction is illustrated which is a slight modification from the one already explained, here only one half the number of contact plates, *k*, *k'*, are used, and a small supplemental motor, L, is employed to impart motion to the contact shoe. This supplemental motor, L, is connected with and drives the worm, *f*, and segment-shaped bar, G, in precisely the same manner as the main motor in the former case but only runs in one direction. In this case the arm, N, carrying the contact shoe, M, is longer and at its extremity carries a second contact shoe, M', which engages an arc-shaped plate, N', placed outside of the contact plates, *k*, *k'*, and which is shorter than the latter so that before the contact shoe, M, has reached the plate, *k'*, the shoe, M', will have passed over the end of the contact plate, N'. The armature, J', is pivoted at its center and on a stud, I', but otherwise is the same as in Fig. 1.

The operation of the apparatus in Fig. 2 is the same as that previously explained with the exception that all the current when starting will not flow from, N, through contact shoe, M, and resistance coil, O, but a part of said current will flow through the second contact shoe, M', then a long arc-shaped contact plate, N', to an additional line, *m²*, and then to a supplemental motor, L, from which it flows along line, *m³*, to line, *m'*, thus starting the supplemental motor and allowing the same to run until it has moved the contact shoe, M', over the end of the arc contact plate, N', at which instance the supplemental motor will stop, because the circuit through it has been broken.

In Fig. 3. still another form of apparatus is shown the operation of which is substantially the same as those already explained. In this form however a pinion, *o*, drives the segment-shaped bar, G, and thereby the contact shoe, M. The contact plates, *k*, *k'*, are arranged as in the apparatus first explained. The armature, J', co-operating with the electro-magnets, H, in this case like in Fig. 2, has a pivot, $i'$, at its center, and the end opposite the one attracted by the electro-magnets, is forked and carries a shaft, $o'$, on which are mounted the pinion, $o$, already referred to, and a drive pulley, $p$; this pulley is connected by a belt, $p'$, with a pulley fixed on the main armature shaft, $B'$, and rotating therewith. The circuits in this plan are the same as those described in the first case, the only difference being in construction and in the belt and pinion referred to.

Having described my invention, I claim as new and desire to secure by Letters Patent—

1. In an automatic starting device for electric motors, the combination of a motor; a resistance for starting said motor; a series of contacts connected with the resistance; a toothed arm carrying a contact shoe in engagement with said contacts; a worm adapted to engage said toothed arm when starting the motor but disengaged therefrom when the motor is not running; mechanism to engage the worm with said toothed arm at the time of starting the motor, whereby the worm imparts to the arm sufficient movement to cut out the resistance from the motor-circuit; and means whereby the contact shoe is returned to the point of greatest resistance when the worm is disengaged from the toothed arm, for the purpose set forth.

2. In an automatic starting device for electric motors, the combination of a motor; a resistance for starting said motor; a series of contacts connected with the resistance; a toothed arm carrying a contact shoe in engagement with said contacts; means co-acting with the toothed arm to automatically impart to the contact shoe a continuous movement over said plates at the time of starting the motor, whereby the resistance from the motor circuit is cut out; and means for returning the contact shoe to the point of greatest resistance when stopping the motor.

3. In an automatic starting device for electric motors, the combination of a motor armature; a resistance coil; a series of contact plates each connected with said coil; a movable toothed bar carrying a contact shoe which is adapted to move over said contact plates successively said shoe being in circuit with the resistance coil; a worm-shaft engaging said bar and connected with the armature-shaft by a universal joint.

4. In an automatic starting device for electric motors, the combination of a motor; a resistance for starting said motor; a series of contacts connected with the resistance; a toothed arm carrying a contact shoe in engagement with said contacts; a revoluble gearing device to mesh with the teeth of the said arm; and means to cause said gearing device to engage said toothed arm when starting the motor and to disengage therefrom when the motor is not running.

In testimony whereof I affix my signature in the presence of two witnesses.

GEORGE H. WHITTINGHAM.

Witnesses:
CHARLES B. MANN, Jr.,
ALVAN MACAULEY.